(12) United States Patent
Forlander (10) Patent No.: US 12,007,307 B1
(45) Date of Patent: Jun. 11, 2024

(54) TEST PORT ASSEMBLY FOR INSPECTING A SEAL AROUND A PIPE PASSING THROUGH A WALL TYPE STRUCTURE

(71) Applicant: W. Thomas Forlander, Lafayette, LA (US)

(72) Inventor: W. Thomas Forlander, Lafayette, LA (US)

( * ) Notice: Subject to any disclaimer, the term of this patent is extended or adjusted under 35 U.S.C. 154(b) by 0 days.

(21) Appl. No.: 18/224,490

(22) Filed: Jul. 20, 2023

Related U.S. Application Data (60) Provisional application No. 63/390,808, filed on Jul. 20, 2022.

(51) Int. Cl.
 *G01M 3/28* (2006.01)
(52) U.S. Cl.
 CPC .................................. *G01M 3/2853* (2013.01)
(58) Field of Classification Search
 CPC ..................................................... G01M 3/2853
 See application file for complete search history.

(56) References Cited

U.S. PATENT DOCUMENTS

| | | |
|---|---|---|
| 5,397,876 A | 3/1995 | Shimamoto et al. |
| 5,649,791 A | 7/1997 | Connolly |
| 5,938,964 A | 8/1999 | Takita et al. |

FOREIGN PATENT DOCUMENTS

EP    0217140 A1 * 4/1987 .............. G01M 3/32

OTHER PUBLICATIONS

English Machine Translation of Lehmann, EP 0217140 A1, translated online Dec. 2023 (Year: 1987).*

* cited by examiner

*Primary Examiner* — David Z Huang
(74) *Attorney, Agent, or Firm* — Greg Mier

(57) ABSTRACT

A test port for testing the sealed annular gap between the outer surface of a pipe and inner surface of an opening in a wall type structure through which the pipe is extended.

6 Claims, 12 Drawing Sheets

SECTION A-A

TEST PORT ASSEMBLY FOR INSPECTING A SEAL AROUND A PIPE PASSING THROUGH A WALL TYPE STRUCTURE

CROSS REFERENCE TO RELATED APPLICATIONS

The present application claims priority from provisional patent application No. 63/390,808, filed on Jul. 20, 2022.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC

Not applicable.

FIELD OF THE INVENTION

The subject invention relates to test ports for testing the sealed annular space between the outer surface of a pipe and inner surface of an opening in a wall type structure through which the pipe is extended.

BACKGROUND

In the piping industry, it is common to have a section of pipe pass through a wall type structure. In some cases, it is desirable to stabilize the pipe passing through the wall type structure to minimize damage to the wall type structure caused by vibrations, shocks, and sound waves emanating from the pipe. It can be also desirable to seal the annular space between the outer surface of the pipe passing through the wall type structure and the inner surface of the opening in the wall type structure to prevent matter from traversing from one side of the wall type structure to the other side of the wall type structure.

In some applications, there is a first seal near one side of the wall type structure and a second seal near the other side of the wall type structure. Both the first seal and the second seal prevent matter from traversing from one side of the wall type structure to the other side of the wall type structure. In addition, the first seal and the second seal create a sealed annular gap between the first and second seals. When such a sealed annular gap exists, it is prudent to periodically inspect the sealed annular gap to determine the pressure inside the sealed annular gap and to evaluate the sealing performance of the first and second seals. The subject invention is a test port assembly designed to inspect the aforementioned sealed annular gap.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 5:
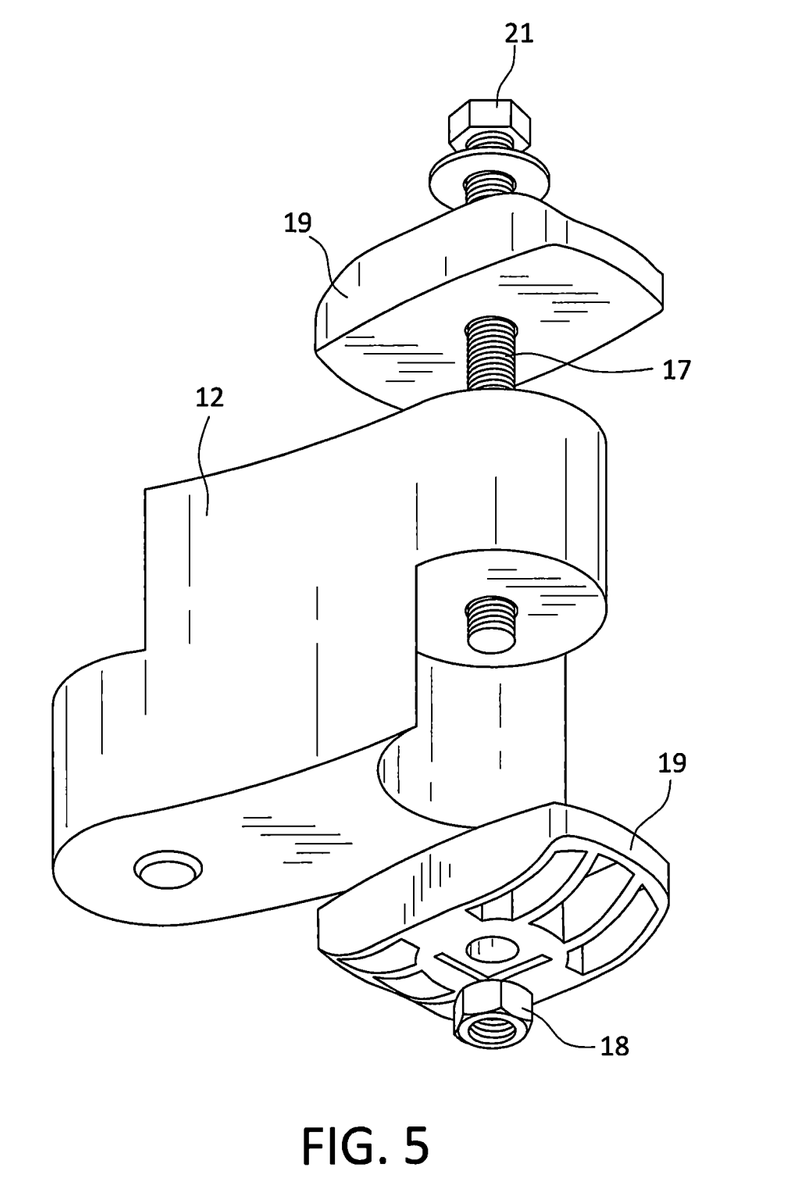
FIG. 5 is an isometric view of a seal component from a set of Innerlynx® Modular Mechanical Seals.
Figure 6:
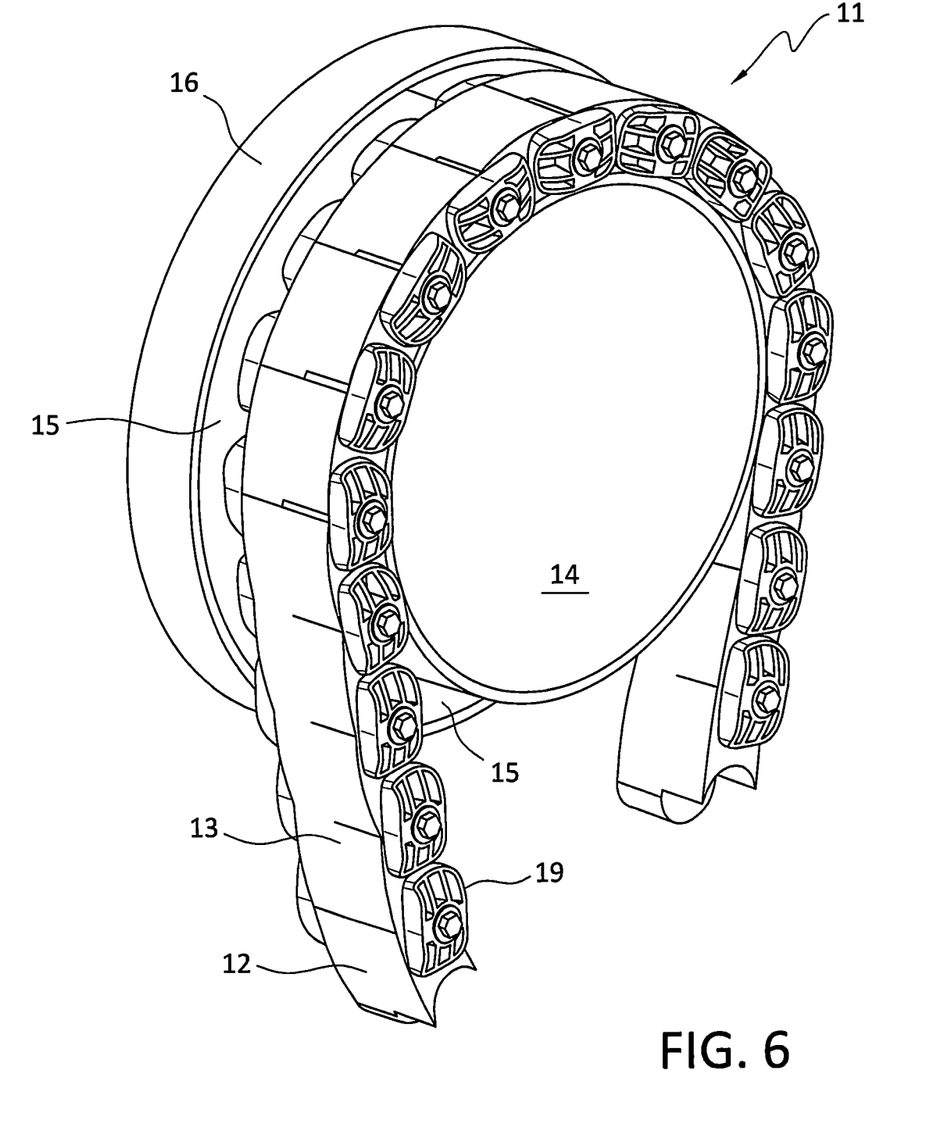
FIG. 6 is an isometric view of a set of Innerlynx® Modular Mechanical Seals draped over a pipe extended through a wall type structure.
Figure 7:
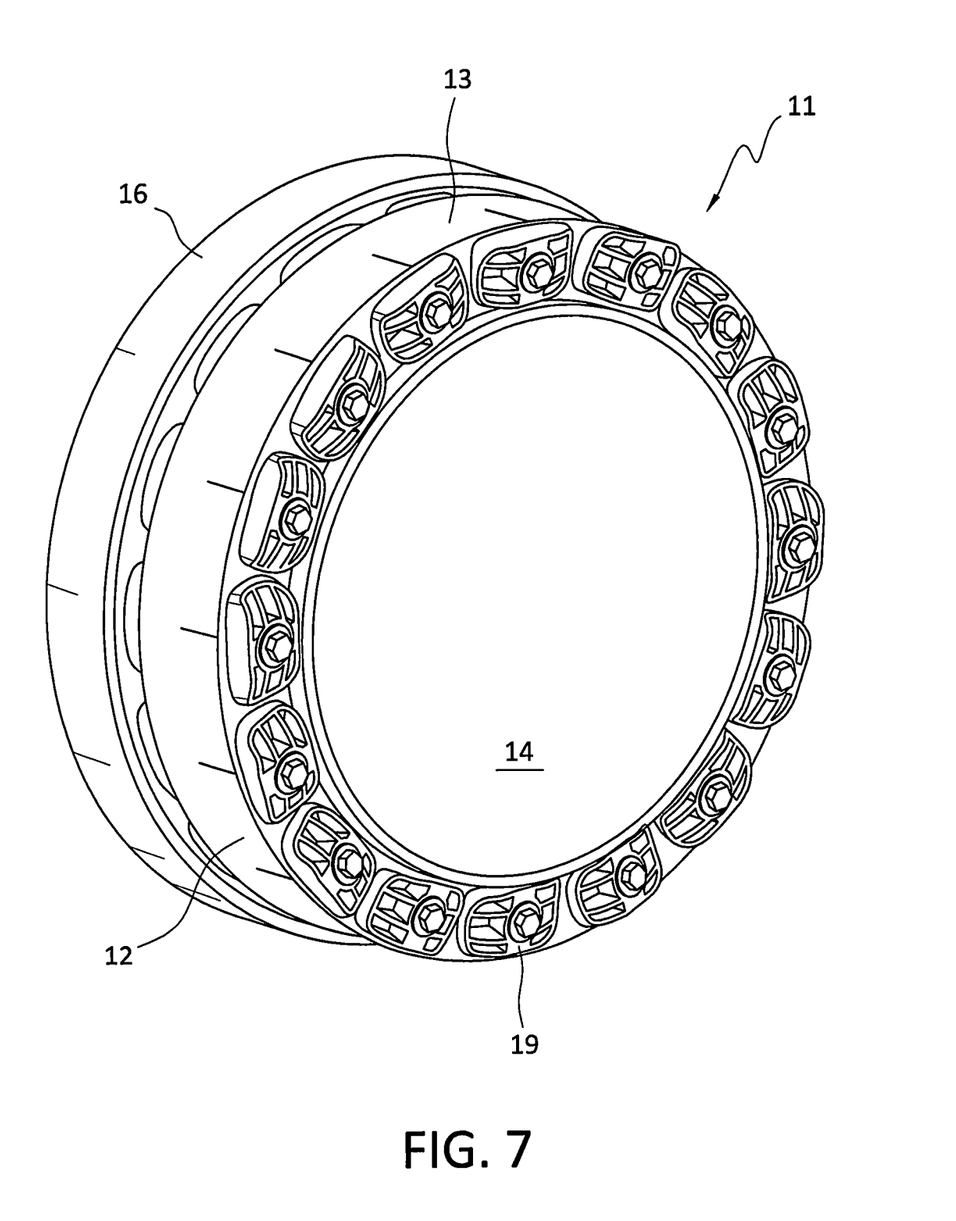
FIG. 7 is an isometric view of a set of Innerlynx® Modular Mechanical Seals wrapped around a pipe extended through a wall type structure.
Figure 8:
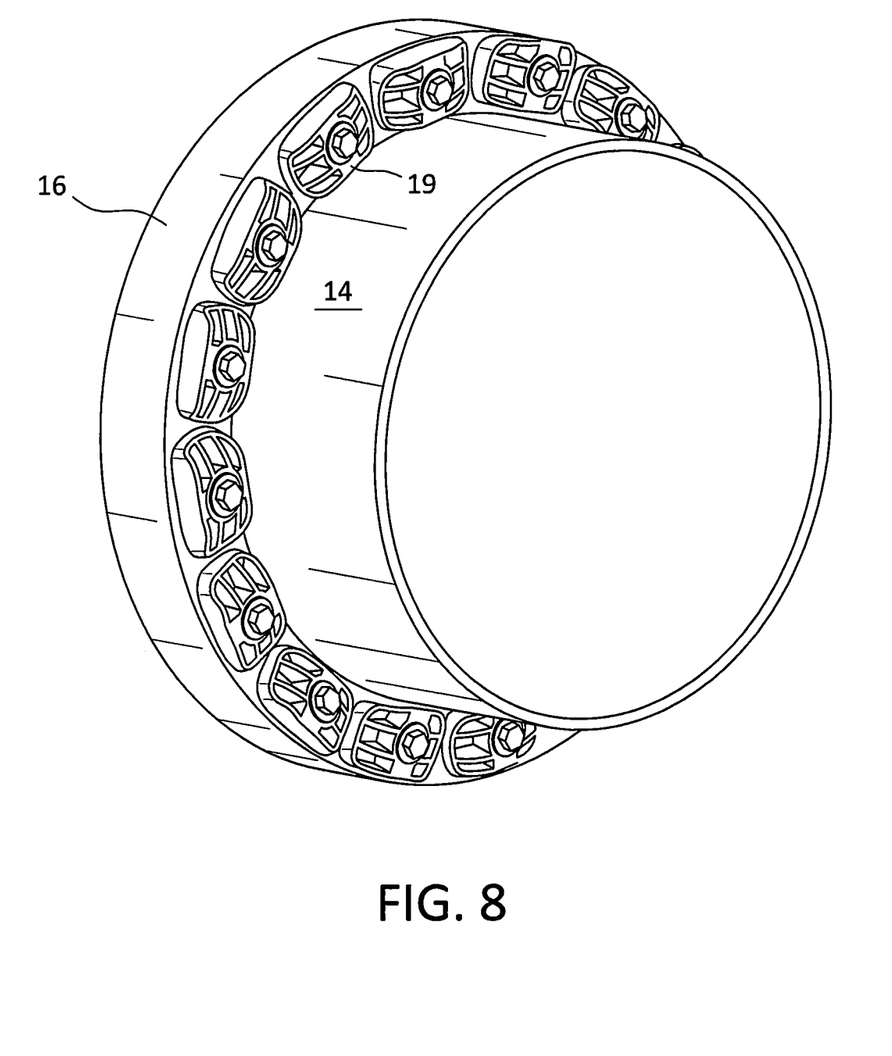
FIG. 8 is an isometric view of a set of Innerlynx® Modular Mechanical Seals inserted between a pipe and a wall type structure.
Figure 9:
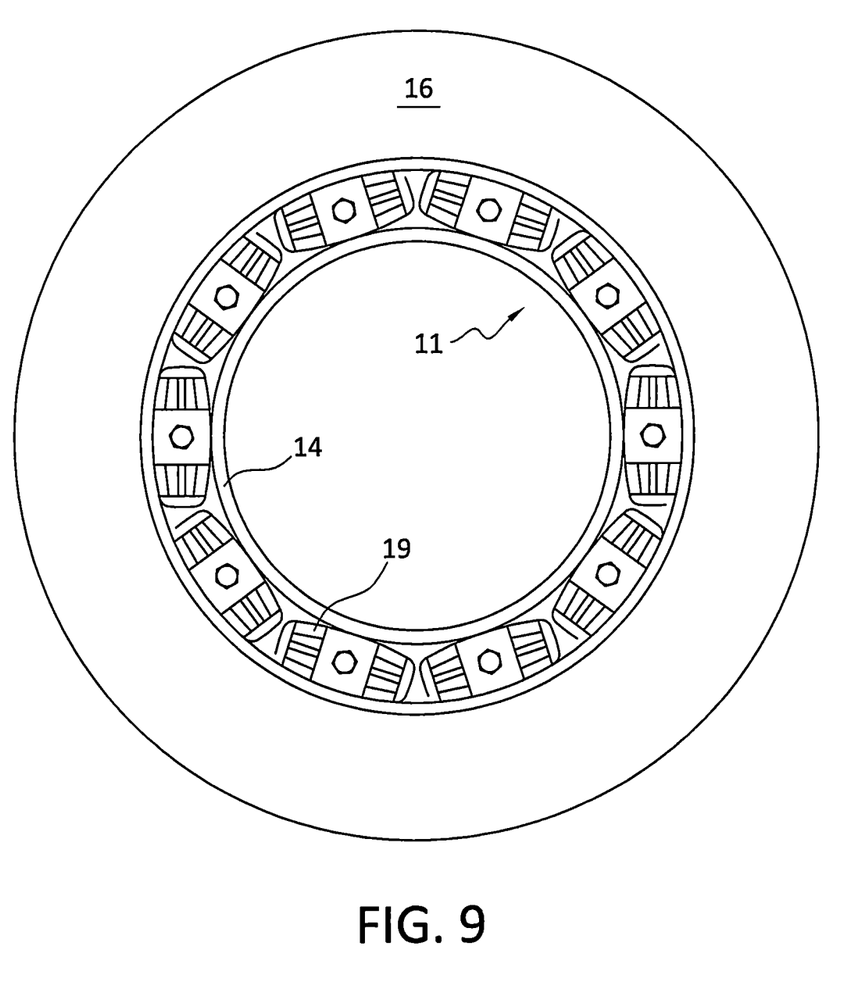
FIG. 9 is a front view of a set of Innerlynx® Modular Mechanical Seals inserted between a pipe and a wall type structure.
Figure 10:
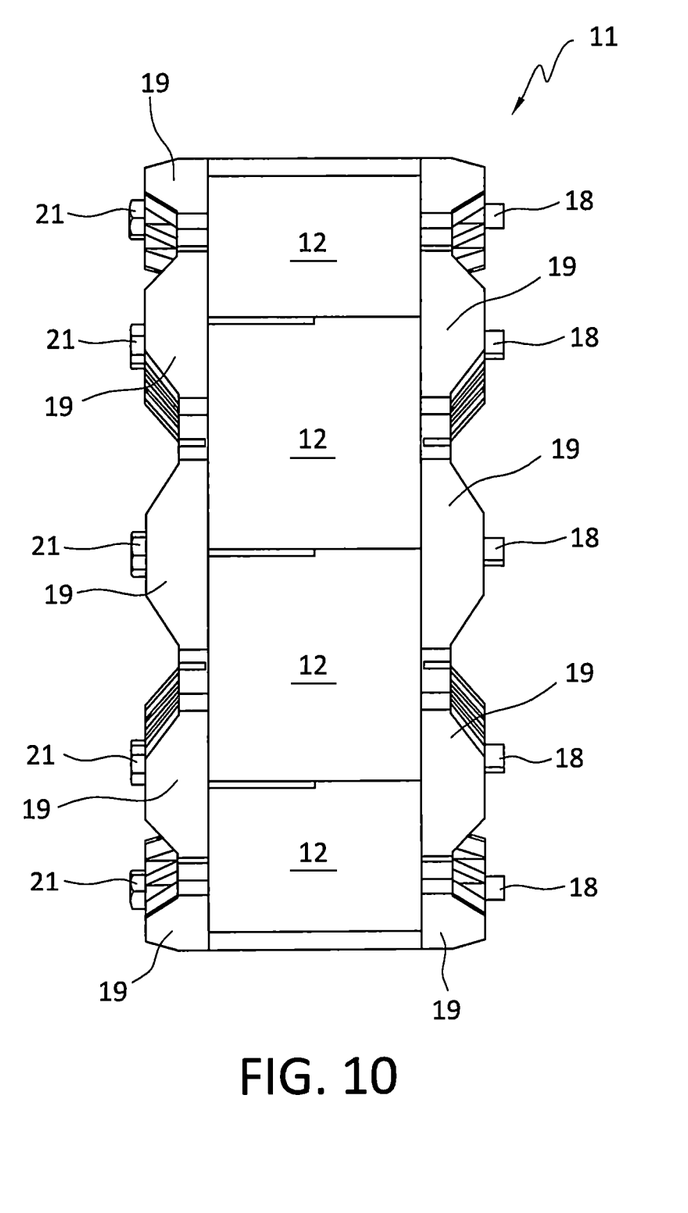
FIG. 10 is a side view of a set of Innerlynx® Modular Mechanical Seals.
Figure 11:
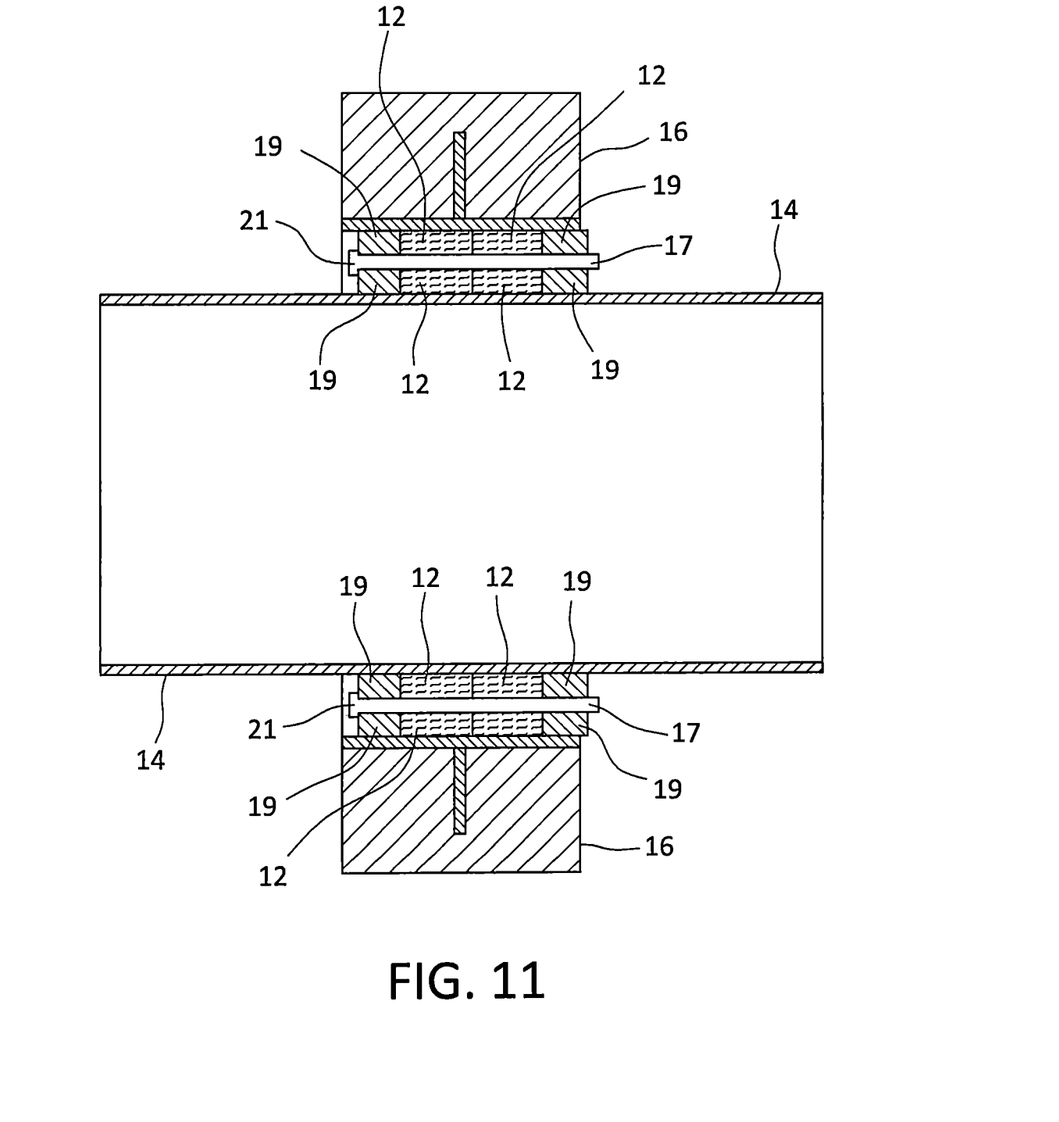
FIG. 11 is a side, cut away view of a set of Innerlynx® Modular Mechanical Seals inserted between a pipe and a wall type structure.

The test port assembly 10 of the present invention is designed to be used with a set of Innerlynx® Modular Mechanical Seals 11, which is manufactured and sold by Advance Products Systems, LLC in Scott, Louisiana. A typical set of Innerlynx® Modular Mechanical Seals 11 is shown in FIGS. 5 through 9. The Innerlynx® Modular Mechanical Seals 11 consist of a series of seal components 12 that that are linked together to form a belt 13 that can be wrapped around a pipe 14 that is extended through an opening 15 in a wall type structure 16, as shown in FIGS. 7 through 9. The seal components 12 are held together with bolts 17 and nuts 18, along with pressure plates 19, as shown in FIG. 5. One bolt 17 and one nut 18 hold two adjacent seal components 12 together. After the belt 13 is positioned between the pipe 14 and the wall type structure 16, as shown in FIGS. 8, 9, and 11, each bolt 17 and nut 18 combination is tightened together, thereby asserting pressure on the pressure plates 19, which causes the seal components 12 to bulge and create a seal between the circumference of the pipe 14 and the inner surface of the opening 15 in the wall type structure 16.

Figure 12:
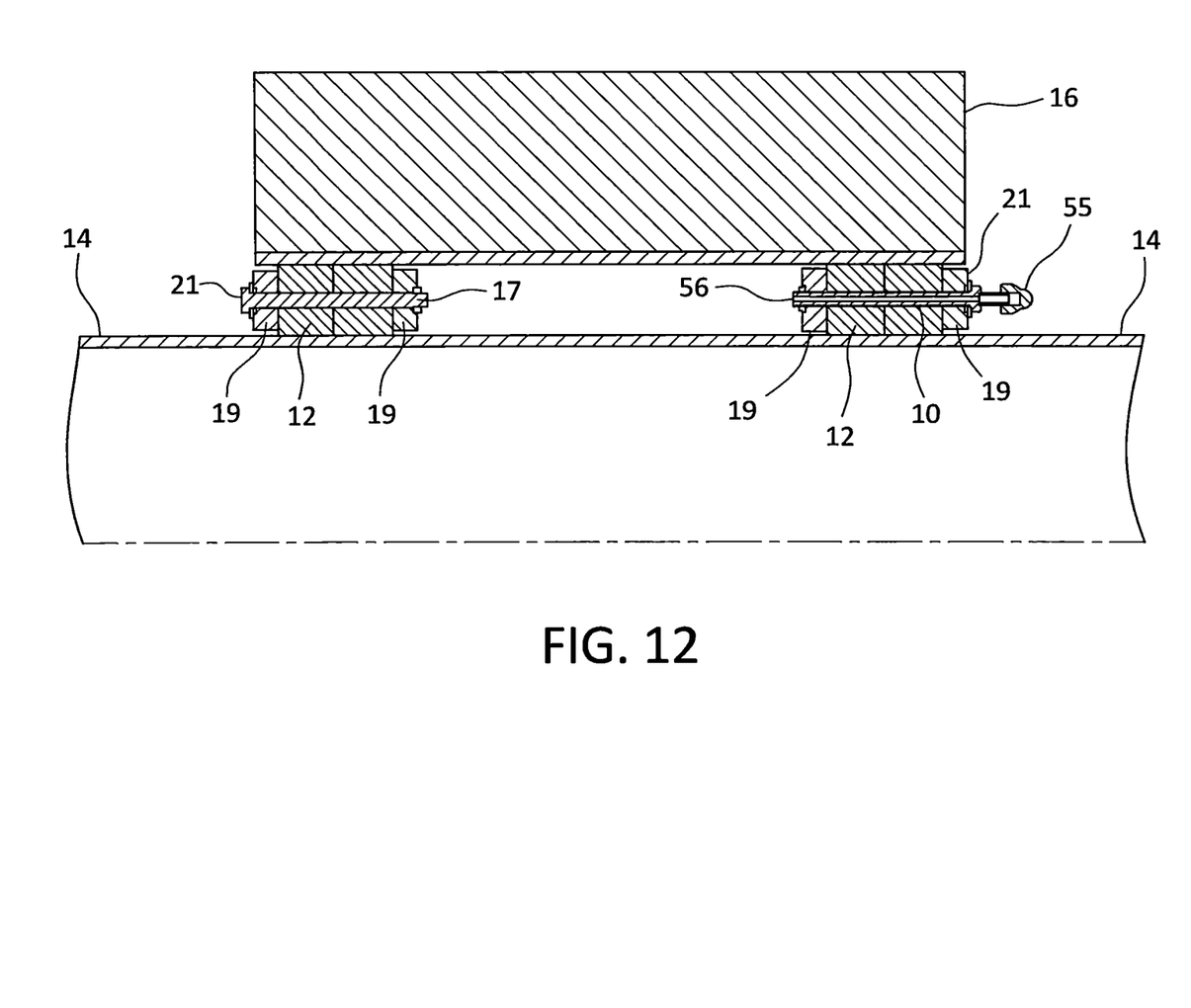
FIG. 12 is a side, cut away view of two sets of Innerlynx® Modular Mechanical Seals inserted between a pipe and a wall type structure, showing the test port assembly of the present invention installed in one of the sets of Innerlynx® Modular Mechanical Seals.
Figure 13:
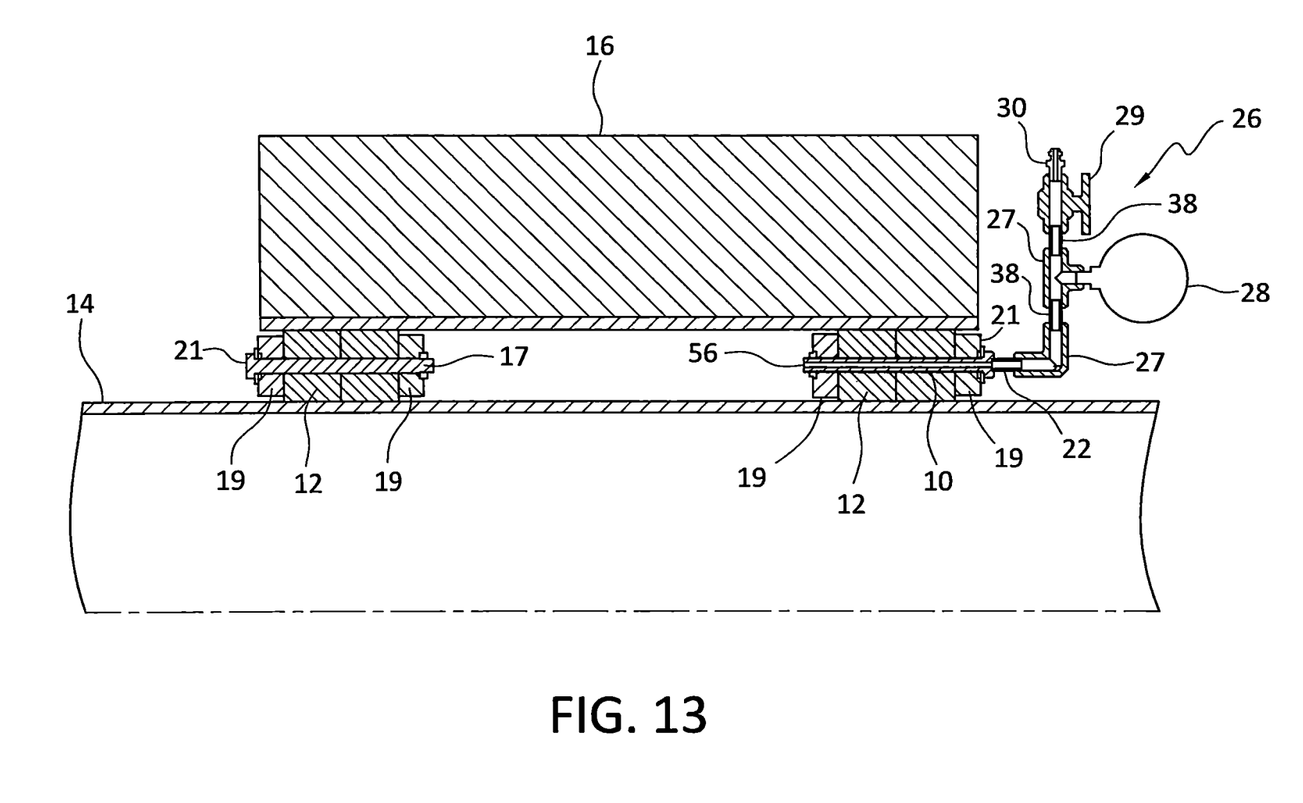
FIG. 13 is a side, cut away view of two sets of Innerlynx® Modular Mechanical Seals inserted between a pipe and a wall type structure, showing the test port assembly of the present invention and an inlet assembly system installed on one of the sets of Innerlynx® Modular Mechanical Seals.

In some cases, one set of Innerlynx® Modular Mechanical Seals 11 is installed on each side of the opening 15 in the wall type structure 16, as shown in FIGS. 12 and 13. In this situation, the sealing action of the two sets of Innerlynx® Modular Mechanical Seals 11 creates a sealed annular gap 20 between the two sets of Innerlynx® Modular Mechanical Seals 11, as shown in FIGS. 12 and 13.

The purpose of the test port assembly 10 of the present invention is to provide access to the sealed annular gap 20 to periodically inspect the pressure inside the sealed area gap 20 and to evaluate the sealing performance of the two sets of Innerlynx® Modular Mechanical Seals 11 installed on each side of the opening in the wall type structure 16.

Figure 1:
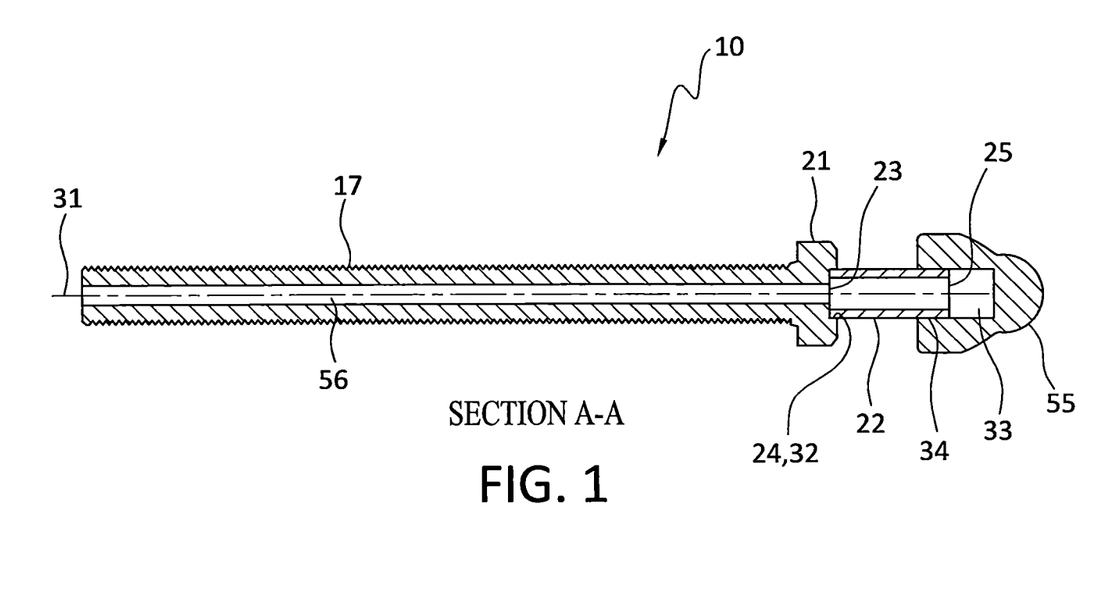
FIG. 1 is a side, cut away view of the test port assembly.
Figure 2:
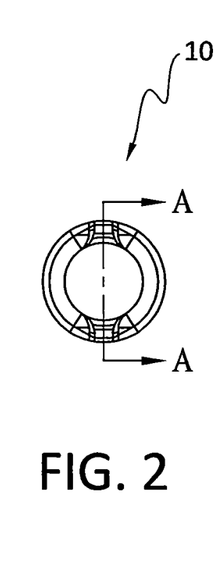
FIG. 2 is an end view of the test port assembly.

The test port assembly 10 of the present invention is shown in FIGS. 1 through 3 and 12 through 13. The test port assembly 10 is preferably designed to replace a bolt 17 in a set of Innerlynx® Modular Mechanical Seals 11. The test port assembly 10 is preferably fabricated by drilling a hole 56 through the entire length of a bolt 17 along the longitudinal axis 31 of the bolt 17, as shown in FIG. 1. In addition, a counterbore 23 is machined into the head 21 of the bolt 17 to receive a nipple 22 that has male threads 32 at its first end 24 and no threads at its second end 25. The second end 25 of the nipple 22 is preferably welded into the counterbore 23.

The test port assembly 10 is preferably equipped with a cap 55 that has a bore 33 with female threads 34 inside the bore 33. The cap 55 is preferably threaded onto the threaded end 24 of the nipple 22 to preserve a seal in the sealed annular gap 20 when not testing or inspecting the sealed annular gap 20.

Figure 3:
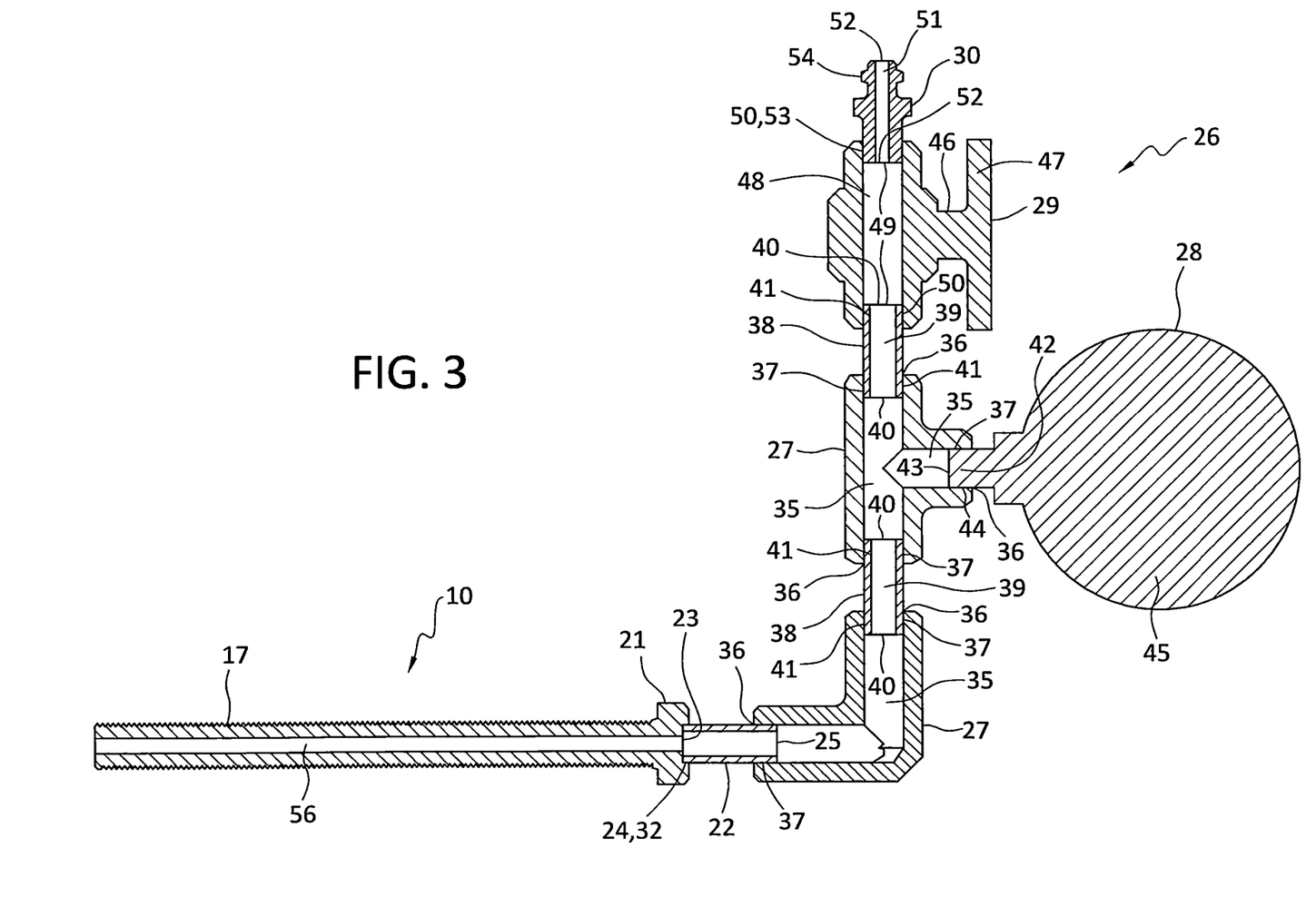
FIG. 3 is a side, cut away view of the test port assembly with an inlet assembly.
Figure 4:
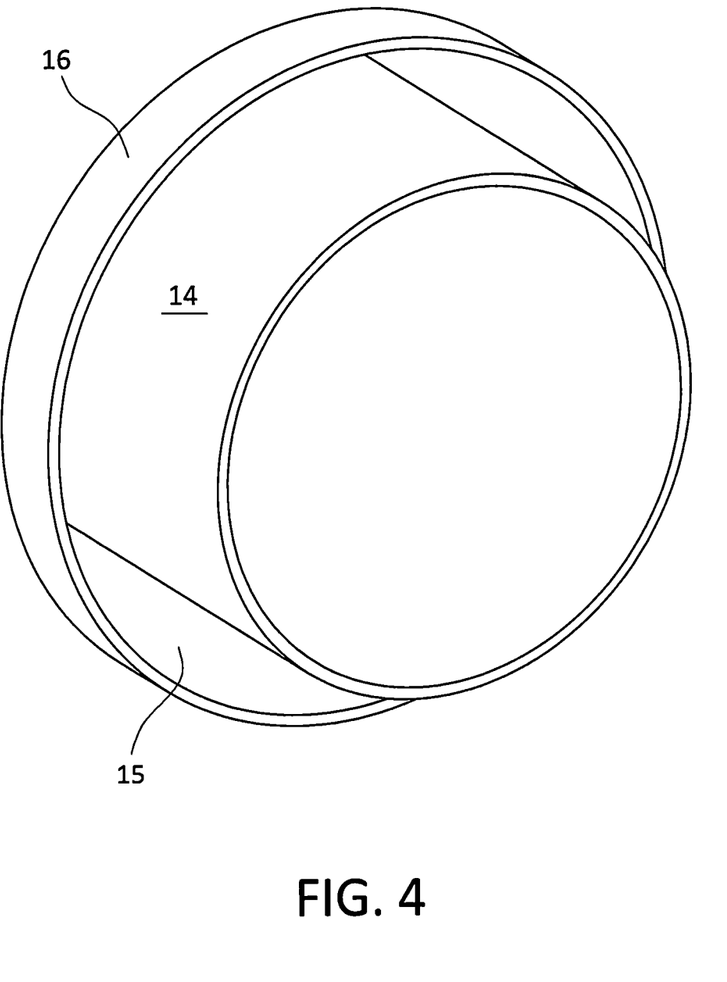
FIG. 4 is an isometric view of a pipe extended through a wall type structure.

As shown in FIGS. 3 and 13, the threaded end 24 of the nipple 22 can be used to attach an inlet assembly system 26 for the purpose of applying pressure to the sealed annular gap 20. The inlet assembly system 26 typically includes fittings 27 with a bore 35, openings 36, and female threads 37; nipples 38 with a bore 39, openings 40, and male threads 41; a pressure gauge 28 with a bore 42, an opening 43, male threads 44, and a pressure measuring mechanism 45; a valve 29 having a valve stem 46, a handle 47, a bore 48, openings 49, and female threads 50; and a connector 30 having a bore 51, openings 52, male threads 53, and a quick connection 54.

It is understood that one embodiment of the present invention has been disclosed by way of example and that other modifications and alterations may occur to those skilled in the art without departing from the scope and spirit of the present invention.

What is claimed is:

1. A test port assembly, comprising:
   (a) a bolt having a longitudinal axis, a length, and a head, said head having a top, where a hole is drilled through said length of said bolt along said longitudinal axis, and where a counterbore is machined into said top of said head of said bolt;
   (b) a nipple having an opening at a first end and an opening at a second end, said nipple having a bore extending from said opening at said first end to said opening in said second end, said first end of said nipple having male threads and said second end of said nipple having no threads, where said second end of said nipple is attached to said counterbore that is machined into said top of said head of said bolt so that said hole in said bolt is connected to said bore in said nipple; and
   (c) a cap having a bore with female threads inside said bore, where said female threads of said bore are screwed onto said male threads of said first end of said nipple.

2. The test port assembly of claim 1, where said test port assembly replaces a bolt in a set of Innerlynx® Modular Mechanical Seals.

3. A test port assembly, comprising:
   (a) a bolt that can be used in a set of Innerlynx® Modular Mechanical Seals to connect two adjacent seal components, said bolt having a longitudinal axis, a length, and a head, said head having a top, where a hole is drilled along the longitudinal axis through the entire length of said bolt, and where a counterbore is machined into the top of said head;
   (b) a first nipple having an opening at a first end and an opening at a second end, said first nipple having a bore extending from said opening at said first end to said opening in said second end, said first end of said first nipple having male threads and said second end of said first nipple having no threads, where said second end of said first nipple is attached to said counterbore that is machined into the top of said head of said bolt so that said hole in said bolt is connected to said bore in said first nipple;
   (c) a first fitting having an opening at a first end and an opening at a second end, said first fitting have a bore extending from said opening in said first end to said opening in said second end, said first fitting having female threads inside said bore at said first end, said first fitting having female threads inside said bore at said second end, where said female threads inside said bore at said first end of said first fitting are threaded onto said male threads of said first end of said first nipple so that said bore in said first nipple is connected to said bore in said first fitting;
   (d) a second nipple having an opening at a first end and an opening at a second end, said second nipple having a bore extending from said opening at said first end to said opening in said second end, said first end of said second nipple having male threads and said second end of said second nipple having male threads, where said male threads of said first end of said second nipple are threaded into said female threads inside said bore at said second end of said first fitting so that said bore in said first fitting is connected to said bore in said second nipple;
   (e) a second fitting having an opening at a first end, an opening at a second end, and an opening at a third end, said second fitting have a bore extending from said opening in said first end to said opening in said second end and to said opening in said third end, said second fitting having female threads inside said bore at said first end, said second fitting having female threads inside said bore at said second end, said second fitting having female threads inside said bore at said third end, where said female threads inside said bore at said first end of said second fitting are threaded onto said male threads of said second end of said second nipple so that said bore in said second nipple is connected to said bore in said second fitting;
   (f) a pressure gauge an opening at a first end, said pressure gauge having a bore extending from said opening at said first end to a pressure measuring mechanism, said first end of said pressure gauge having male threads, where said male threads of said first end of said pressure gauge are threaded into said female threads inside said bore at said second end of said second fitting so that said bore in said second fitting is connected to said bore in said pressure gauge;

(g) a third nipple having an opening at a first end and an opening at a second end, said third nipple having a bore extending from said opening at said first end to said opening in said second end, said first end of said third nipple having male threads and said second end of said third nipple having male threads, where said male threads of said first end of said third nipple are threaded into said female threads inside said bore at said third end of said second fitting so that said bore in said second fitting is connected to said bore in said third nipple;

(h) a valve having a valve stem and a handle at the end of said valve stem, said valve having an opening at a first end and an opening at a second end, said valve have a bore extending from said opening in said first end to said opening in said second end, said valve having female threads inside said bore at said first end, said valve having female threads inside said bore at said second end, where said female threads inside said bore at said first end of said valve are threaded onto said male threads of said second end of said third nipple so that said bore in said third nipple is connected to said bore in said valve; and (i) a connector having an opening at a first end and an opening at a second end, said connector having a bore extending from said opening at said first end to said opening in said second end, said first end of said connector having male threads and said second end of said connector having a quick connection, where said male threads of said first end of said connector are threaded into said female threads inside said bore at said second end of said valve so that said bore in said valve is connected to said bore in said connector.

4. A test port assembly comprising:

(a) a set of Innerlynx® Modular Mechanical Seals comprising a series of seal components that that are linked together with bolts, nuts, and pressure plates to form a belt of seal components that can be wrapped and tightened around a pipe;

(b) one of the bolts used in said set of Innerlynx® Modular Mechanical Seals having a longitudinal axis, a length, and a head, said head having a top, where a hole is drilled along the longitudinal axis through the entire length of said bolt, and where a counterbore is machined into the top of said head; and (c) a first nipple having an opening at a first end and an opening at a second end, said first nipple having a bore extending from said opening at said first end to said opening in said second end, said first end of said first nipple having male threads and said second end of said first nipple having no threads, where said second end of said first nipple is attached to said counterbore that is machined into the top of said head of said bolt so that said hole in said bolt is connected to said bore in said first nipple.

5. The test port assembly of claim 4, further comprising a cap having a bore with female threads inside said bore, where said female threads of said bore are screwed onto said male threads of said first end of said first nipple.

6. The test port assembly of claim 4, further comprising:

(d) a first fitting having an opening at a first end and an opening at a second end, said first fitting have a bore extending from said opening in said first end to said opening in said second end, said first fitting having female threads inside said bore at said first end, said first fitting having female threads inside said bore at said second end, where said female threads inside said bore at said first end of said first fitting are threaded onto said male threads of said first end of said first nipple so that said bore in said first nipple is connected to said bore in said first fitting;

(e) a second nipple having an opening at a first end and an opening at a second end, said second nipple having a bore extending from said opening at said first end to said opening in said second end, said first end of said second nipple having male threads and said second end of said second nipple having male threads, where said male threads of said first end of said second nipple are threaded into said female threads inside said bore at said second end of said first fitting so that said bore in said first fitting is connected to said bore in said second nipple;

(f) a second fitting having an opening at a first end, an opening at a second end, and an opening at a third end, said second fitting have a bore extending from said opening in said first end to said opening in said second end and to said opening in said third end, said second fitting having female threads inside said bore at said first end, said second fitting having female threads inside said bore at said second end, said second fitting having female threads inside said bore at said third end, where said female threads inside said bore at said first end of said second fitting are threaded onto said male threads of said second end of said second nipple so that said bore in said second nipple is connected to said bore in said second fitting;

(g) a pressure gauge an opening at a first end, said pressure gauge having a bore extending from said opening at said first end to a pressure measuring mechanism, said first end of said pressure gauge having male threads, where said male threads of said first end of said pressure gauge are threaded into said female threads inside said bore at said second end of said second fitting so that said bore in said second fitting is connected to said bore in said pressure gauge;

(h) a third nipple having an opening at a first end and an opening at a second end, said third nipple having a bore extending from said opening at said first end to said opening in said second end, said first end of said third nipple having male threads and said second end of said third nipple having male threads, where said male threads of said first end of said third nipple are threaded into said female threads inside said bore at said third end of said second fitting so that said bore in said second fitting is connected to said bore in said third nipple;

(i) a valve having a valve stem and a handle at the end of said valve stem, said valve having an opening at a first end and an opening at a second end, said valve have a bore extending from said opening in said first end to said opening in said second end, said valve having female threads inside said bore at said first end, said valve having female threads inside said bore at said second end, where said female threads inside said bore at said first end of said valve are threaded onto said male threads of said second end of said third nipple so that said bore in said third nipple is connected to said bore in said valve; and (j) a connector having an opening at a first end and an opening at a second end, said connector having a bore extending from said opening at said first end to said opening in said second end, said first end of said connector having male threads and said second end of said connector having a quick connection, where said male threads of said first end of said connector are threaded into said female threads inside said bore at said second end of said valve so that said bore in said valve is connected to said bore in said connector.

* * * * *